US008909907B2

(12) United States Patent
Bonanno et al.

(10) Patent No.: US 8,909,907 B2
(45) Date of Patent: Dec. 9, 2014

(54) REDUCING BRANCH PREDICTION LATENCY USING A BRANCH TARGET BUFFER WITH A MOST RECENTLY USED COLUMN PREDICTION

(75) Inventors: James J. Bonanno, Wappingers Falls, NY (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1615 days.

(21) Appl. No.: 12/029,547

(22) Filed: Feb. 12, 2008

(65) Prior Publication Data

US 2009/0204799 A1 Aug. 13, 2009

(51) Int. Cl.
*G06F 9/00* (2006.01)
*G06F 9/38* (2006.01)

(52) U.S. Cl.
CPC ............ *G06F 9/3806* (2013.01); *G06F 9/3844* (2013.01)
USPC .......................................... 712/239; 712/238

(58) Field of Classification Search
CPC . G06F 9/30058; G06F 9/3806; G06F 9/3844; G06F 9/3848
USPC ........................... 712/233, 234, 238, 239, 240
See application file for complete search history.

(56) References Cited

U.S. PATENT DOCUMENTS

| | | | |
|---|---|---|---|
| 5,394,529 A | | 2/1995 | Brown, III et al. |
| 5,574,871 A * | 11/1996 | Hoyt et al. ..................... 712/200 |
| 5,604,877 A * | 2/1997 | Hoyt et al. ..................... 712/243 |
| 5,740,415 A * | 4/1998 | Hara ............................. 712/238 |
| 6,553,488 B2 * | 4/2003 | Yeh et al. ...................... 712/239 |
| 6,601,161 B2 * | 7/2003 | Rappoport et al. ........... 712/238 |
| 6,643,739 B2 * | 11/2003 | Van De Waerdt et al. ..... 711/128 |
| 2004/0003213 A1 | 1/2004 | Bockhaus et al. |
| 2004/0172524 A1 | 9/2004 | Hoogerbrugge |
| 2005/0204120 A1 * | 9/2005 | Prasky et al. ................. 712/238 |

OTHER PUBLICATIONS

Shen et al., "Modern Processor Design—Fundamentals of Superscalar Processors", McGraw-Hill, 2005, pp. 230-231.*
Tang et al., "Integrated I-cache Way Predictor and Branch Target Buffer to Reduce Energy Consumption", University of California at Irvine, 2002, pp. 120-132.*
Daniel Jimenez, "Delay-Sensitive Branch Predictors for Future Technologies", PhD Thesis, University of Texas at Austin, Jan. 2002, pp. 1-18, 129-135.
z/Architecture Principles of Operation, International Business Machines Corporation, SA22-7832-05, Sixth Edition (Apr. 2007), pp. 5-9, 7-23 through 7-31, C-1 through C-4.

* cited by examiner

*Primary Examiner* — David J Huisman
(74) *Attorney, Agent, or Firm* — Cantor Colburn LLP; Margaret McNamara

(57) ABSTRACT

Exemplary embodiments include a system and method for reducing branch prediction latency using a branch target buffer with most recently used column prediction. An exemplary embodiment includes a method for reducing branch prediction latency, the method including reading most-recently-used information from a most-recently-used table associated with the branch target buffer where each most-recently-used entry corresponds to one or more branch target buffer rows and specifies the ordering from least-recently-used to most-recently-used of the associated branch target buffer columns, selecting a row from the branch target buffer and simultaneously selecting the associated entry from the most-recently-used table and speculating that there is a prediction in the most recently used column of the plurality of columns from the selected row from the branch target buffer while determining whether there is a prediction and which column contains the prediction.

13 Claims, 6 Drawing Sheets

| CYCLE | 1 | 2 | 3 | 4 | 5 | 6 |
|---|---|---|---|---|---|---|
| IF PREDICTION IS NOT IN MRU COLUMN | INDEX (SEND CURRENT SEARCH ADDRESS TO THE BTB) 402 | LOOKUP1 (ARRAY ACCESS) 404 | LOOKUP2 (ARRAY ACCESS, WIRE TRANSFER) 406 | HIT1 408 DETERMINE WHICH (IF ANY) OF THE SELECTED BTB ENTRIES CONTAINS A PREDICTION FROM BTB ENTRY IN MRU-PREDICTED COLUMN, SELECT PREDICTION INFORMATION AND RE-INDEX | HIT2 410 FROM BTB ENTRY IN THE COLUMN DETERMINED TO CONTAIN THE PREDICTION, SELECT PREDICTION INFORMATION AND RE-INDEX | REPORT PREDICTION 412B |
| IF PREDICTION IS IN MRU COLUMN | INDEX 402 | LOOKUP1 404 | LOOKUP2 406 | HIT1 408 FROM BTB ENTRY IN MRU-PREDICTED COLUMN, SELECT PREDICTION INFORMATION AND RE-INDEX | REPORT PREDICTION 412A | |

REDUCING BRANCH PREDICTION LATENCY USING A BRANCH TARGET BUFFER WITH A MOST RECENTLY USED COLUMN PREDICTION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to processor pipelines, branch prediction and branch prediction latency, and particularly to a system and method and for reducing branch prediction latency using a branch target buffer with most recently used column prediction.

2. Description of Background

Branch prediction is a performance-critical component of a pipelined high frequency microprocessor and is used to predict the direction (taken vs. not taken) and the target address of branch instructions, which is beneficial because it allows processing to continue along a branch's predicted path rather than having to wait for the outcome of the branch to be determined. An additional penalty is incurred only if a branch is mis-predicted.

A Branch Target Buffer (BTB) is a structure that stores branch and target information. Other structures such as a Branch History Table (BHT) and Pattern History Table (PHT) can be included to store information used for branch direction prediction.

The BTB can be searched in parallel to and independently from instruction fetching to find upcoming branches, in which case it is called lookahead branch prediction. Alternatively, the BTB can be accessed simultaneously with or after fetching instructions and determining instruction boundaries in order to provide a prediction for each encountered branch instruction. In either case the performance benefit of the BTB is a function of the accuracy of the prediction provided from the BTB and the latency required to access the BTB. A large BTB can often provide better prediction accuracy than a small one because it can store information about more branch instructions, however it has a longer latency than a smaller BTB.

Current solutions to reduce or mitigate branch prediction delay include hierarchical predictors, which are implemented solely in hardware, and cooperative predictors, which rely on hardware support for compiler optimizations based on profiling. Regardless of whether or not structures such as hierarchical predictors and cooperative predictors, are employed, techniques to minimize the latency of a set associative BTB are needed.

SUMMARY OF THE INVENTION

An exemplary embodiment includes a method for reducing branch prediction latency, the method including reading most-recently-used information from a most-recently-used table associated with the branch target buffer where each most-recently-used entry corresponds to one or more branch target buffer rows and specifies the ordering from least-recently-used to most-recently-used of the associated branch target buffer columns, selecting a row from the branch target buffer and simultaneously selecting the associated entry from the most-recently-used table and speculating that there is a prediction in the most recently used column of the plurality of columns from the selected row from the branch target buffer while determining whether there is a prediction and which column contains the prediction thereby accelerating a time period in which predicted branch information can be reported, and in a lookahead predictor accelerating how quickly the next prediction can be provided.

A further exemplary embodiment includes a system for reducing branch prediction latency, the system including a microprocessor with branch prediction, the microprocessor including a microprocessor pipeline having an instruction stream and a branch target buffer, wherein the microprocessor performs reading most-recently-used information from a most-recently-used table associated with the branch target buffer where each most-recently-used entry corresponds to one or more branch target buffer rows and specifies the ordering from least-recently-used to most-recently-used of the associated branch target buffer columns, selecting a row from the branch target buffer and simultaneously selecting the associated entry from the most-recently-used table and speculating that there is a prediction in the most recently used column of the plurality of columns from the selected row from the branch target buffer while determining whether there is a prediction and which column contains the prediction thereby accelerating a time period in which predicted branch information can be reported, and in a lookahead predictor acceleration how quickly the next prediction can be provided.

A further exemplary embodiment includes a method for reducing branch prediction latency, the method including generating a search address every cycle in a microprocessor, which is used to index a branch target buffer thereby selecting a row of branch target buffer entries containing tags that are compared against the search address to determine whether any column of the selected branch target buffer row contains an upcoming predicted branch, setting a restart address as a search address, prior to determining the column of the branch target buffer containing a next predicted branch, setting a target or sequential address of a speculatively predicted branch from the most-recently used branch target buffer entry as the search address, setting a target or sequential address of the predicted branch from the branch target buffer column containing the branch prediction information and setting an incremented search address as the search address.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates a table displaying how the pipelined branch prediction search in a lookahead predictor can utilize MRU information in accordance with an exemplary embodiment;

The detailed description explains the preferred embodiments of the invention, together with advantages and features, by way of example with reference to the drawings.

DETAILED DESCRIPTION OF THE INVENTION

An exemplary embodiment includes a system and method and that implements a microprocessor having an n-way set associative BTB. In an exemplary embodiment, the systems and methods described herein implement most-recently-used (MRU) information to decrease branch prediction latency. In an exemplary embodiment, if the required BTB entry is in the MRU position of the selected BTB row, then the latency for reporting that prediction is faster than would otherwise be possible. Employing this mechanism does not change branch prediction latency for cases when the required prediction information is not in the MRU column, which is effective because it is often the case that the prediction needed from a particular BTB row is in the MRU position. If the technique of MRU column prediction is used, the average latency for a branch prediction for a BTB of a specified size is reduced. Equivalently, a larger BTB can be used than would otherwise be possible to achieve a specified average latency per branch prediction. In an exemplary embodiment, structures such as the BHT and the PHT can be accessed in parallel with the BTB with the same latency as the BTB.

In additional exemplary embodiments, prediction latency is reduced by 1 cycle when it is found in the MRU column or more general in that the latency for reporting a prediction found to be in the MRU column is less (by at least one cycle) than the latency for predictions found not to be in the MRU column. In additional exemplary embodiments, latency of predictions is improved by implementing MRU information when the prediction happens to be in the MRU column, and predictions are not penalized when they are not in the MRU column. When not in the MRU column, a prediction is reported with the same latency as would have been possible if MRU information were not used in the search process.

Figure 1:
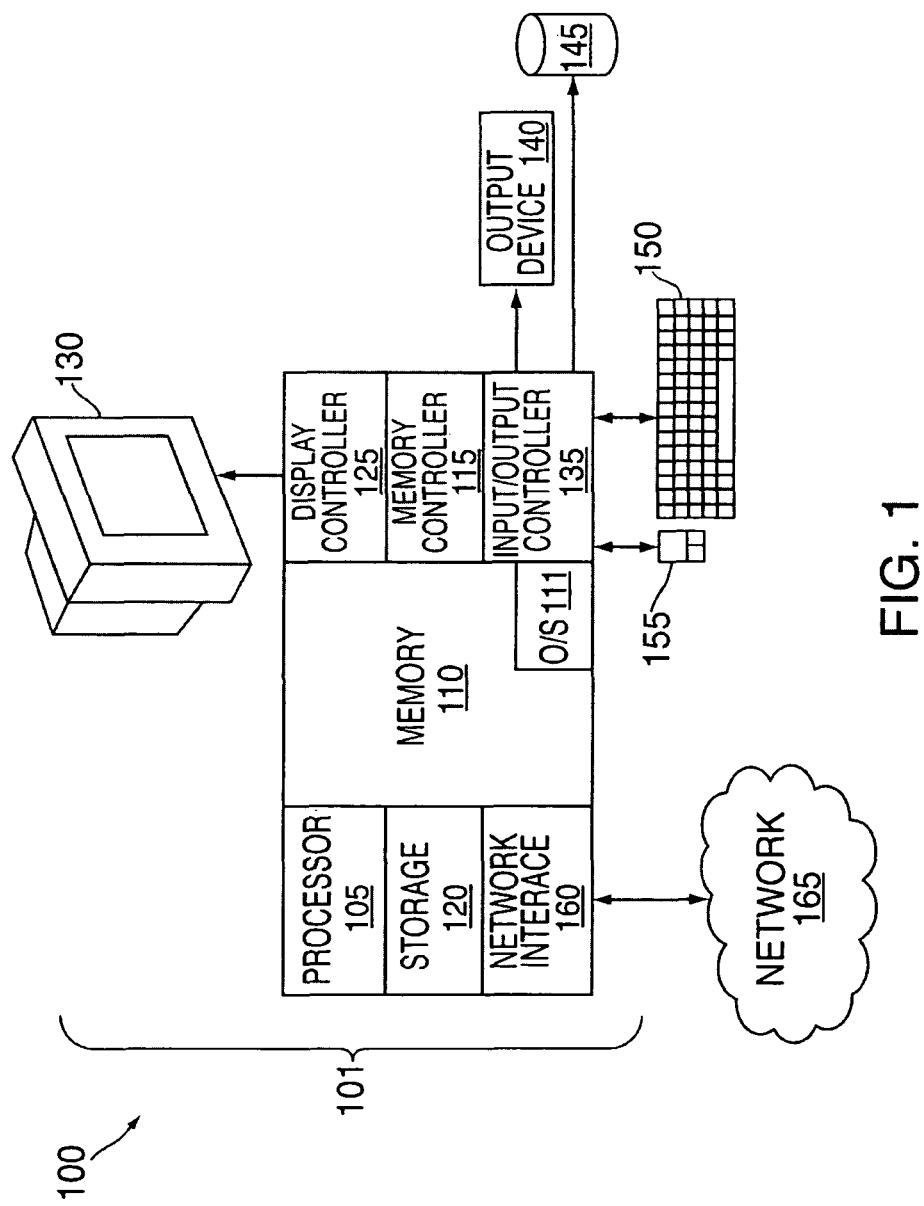
FIG. 1 illustrates a block diagram of a system for reducing branch prediction latency using a branch target buffer with most recently used column prediction.

FIG. 1 illustrates a block diagram of a system 100 for reducing branch prediction latency using a branch target buffer with most recently used column prediction. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory I/O a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions. The computer 101 can include any suitable computer readable medium 120 for use by or in connection with any computer related system or method.

In an exemplary embodiment, where the branch prediction latency reduction methods are implemented in hardware, the branch prediction latency reduction methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
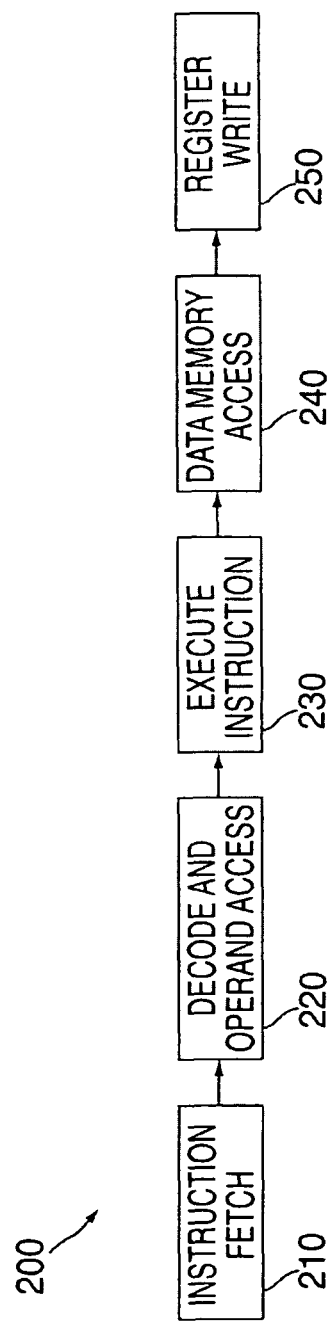
FIG. 2 illustrates a block diagram of a processor instruction pipeline system in which the exemplary branch prediction latency reduction methods can be implemented in accordance with an exemplary embodiment.

FIG. 2 illustrates a block diagram of a processor instruction pipeline system 200 in which the exemplary branch prediction latency reduction methods can be implemented in accordance with an exemplary embodiment. As described above, the simplest way to speed up the processor 105 operation is to pipeline it. Pipelining is one specific form of parallelism, where the execution of several instructions can be interleaved on the same hardware. In an exemplary embodiment, the pipeline system includes five stages: (1) Instruction fetch 210; (2) Decode and operand access 220; (3) Execute instruction 230; (4) Data memory access 240; and (5) Register write 250. In an exemplary embodiment, the instruction fetch 210 stage fetches instructions to be processed. The Decode and operand access 220 stage decodes the instruction and gathers the source operands needed by the instruction being processed. The Execute instruction 230 stage performs the function of the instructions which can include arithmetic logic unit (ALU) operations. The Data memory access 240 stage performs any data memory access functions associated with the instruction. The Write Register write 250 stage writes the appropriate result value into the register file. The pipeline system 200 can be enhanced by implementing the microprocessor 105 to have an n-way set associative BTB and to implement most-recently-used (MRU) information to decrease branch prediction latency as further described herein.

Figure 3:
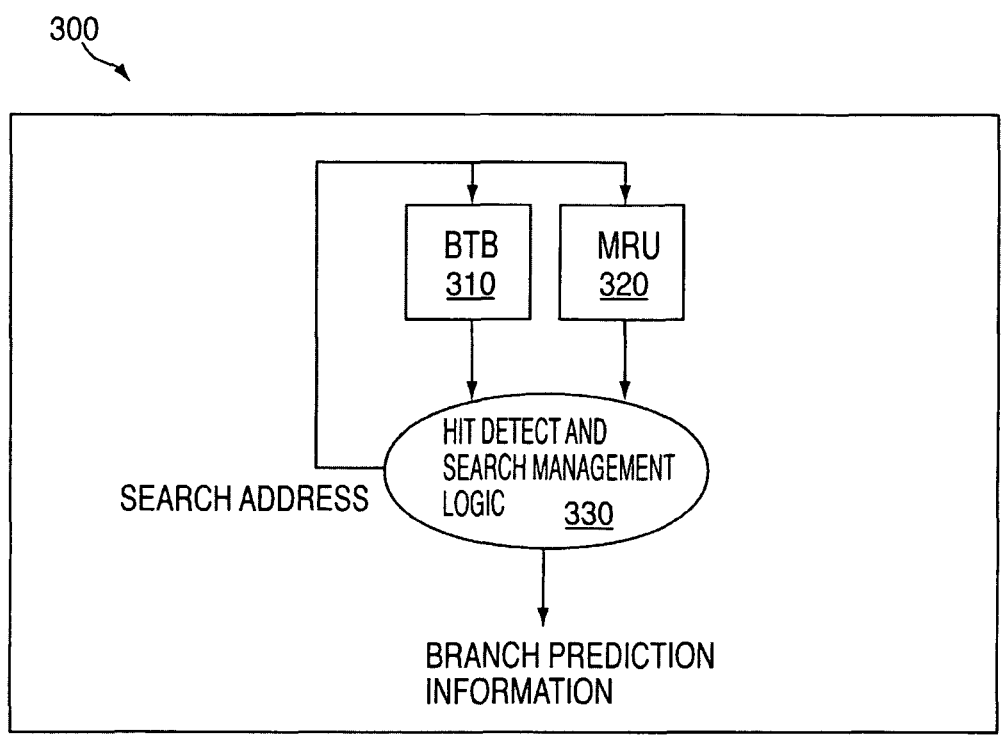
FIG. 3 illustrates the branch prediction search process which can be located in a stage of the pipeline of FIG. 2 or asynchronously from and in parallel with the instruction fetch stage of the pipeline of FIG. 2 in which the branch prediction latency reduction methods may be implemented in accordance with an exemplary embodiment.

FIG. 3 illustrates the branch prediction search process which can be located in a stage of the pipeline of FIG. 2 or asynchronously from and in parallel with the instruction fetch stage of the pipeline of FIG. 2 in which the branch prediction latency reduction methods may be implemented in accordance with an exemplary embodiment. In an exemplary embodiment, the stage 300 includes a branch target buffer (BTB) 310 and a most recently used (MRU) module 320. The BTB 310 and the MRU module 320 are coupled to hit detect and management logic 330 that releases branch prediction information into the pipeline 300 as further described herein. In an exemplary embodiment, the MRU information is used to decrease branch prediction latency. For each row (or alternately set of rows) of the BTB 310, least-recently-used (LRU)/most-recently-used (MRU) information is maintained in order to determine which entry to replace (the LRU entry) when a branch is first encountered (or re-encountered if it was previously replaced). An entry is referred to as "MRU" when it is added to the BTB 310 and also whenever a branch instruction predicted by that entry completes. In an exemplary embodiment, the MRU information is read at the same time as searching the BTB for a branch prediction. The MRU information also determines whether there is a prediction in the MRU column while the hit detection hardware is in the process of determining which (if any) of the selected BTB 310 entries contains a prediction.

Figure 5:
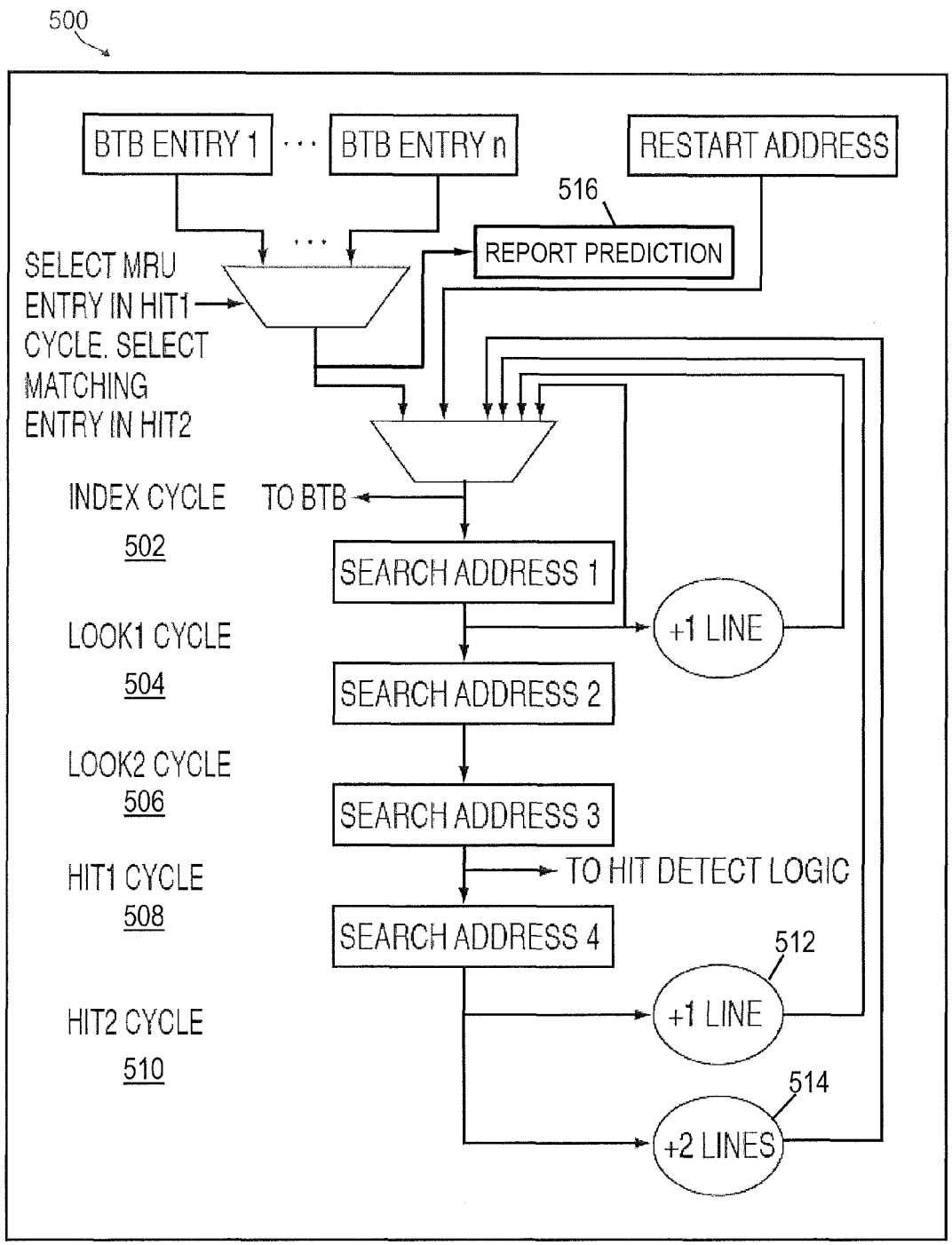
FIG. 5 illustrates a block diagram of the hardware to generate the search address in FIG. 3 in a pipelined manner as illustrated in FIG. 4 for reducing branch prediction latency using a branch target buffer with most recently used column prediction.

FIG. 4 illustrates an example of a table 400 displaying how the pipelined branch prediction search in a lookahead predictor can utilize MRU information in accordance with an exemplary embodiment. FIG. 5 illustrates a block diagram 500 of the hardware to generate the search address in FIG. 3 in a pipelined manner as illustrated in FIG. 4 for reducing branch prediction latency using a branch target buffer with most recently used column prediction. Referring to FIG. 4, in Cycle1 (Index at 402), the flow 500 (of FIG. 5) sends a current search address to the BTB 310 at 502. In Cycle2, (Lookup1 at 404) the flow 500 accesses the sections of the arrays specified by the search address at 504. In Cycle3 (Lookup2 at 406), the array access completes and the selected data is transferred to the hit detection logic at 506. In Cycle4 (Hit1 at 408), the flow 500 determines if and if so which of the selected BTB 310 entries contains a prediction at 508. Furthermore, the flow 500 re-indexes with the target of the predicted taken branch or sequential address of a not-taken branch in the BTB column specified by the MRU 320. In Cycle5 (Hit2) of a predicted branch not in the MRU column at 410, or when there is no prediction at all and no simultaneous Hit1 cycle of a younger pipelined search, the flow re-indexes with a target of a predicted taken branch or sequential address of a not-taken branch from the BTB 310 entry in the column containing the prediction. When there is no prediction in Cycle5 (Hit2) and no simultaneous Hit1 cycle of a younger pipelined search, the flow 500 re-indexes with either "Search Address 4+1 line" at 512 or "Search Address 4 +2 lines" at 514 depending on the number of sequential search cycles (Index) that took place after the search currently in the Hit2 cycle at 510. In Cycle5 (Report Prediction at 412A) when a prediction is found in the MRU column or Cycle6 (Report Prediction at 412B) when a prediction is found in a non-MRU column, the flow 500 provides a report of the prediction to the pipeline 200 at 516.

In an exemplary embodiment, in the Hit1 cycle at 408 and 508 the selected BTB 310 entries are examined to determine if any, and if so which contains a prediction for an upcoming branch. Rather than waiting for that determination, it is assumed that there is a prediction in the MRU BTB entry. The information from the MRU entry is used to re-index the BTB 310 at 408. If there is indeed a prediction in the MRU entry, then the search process continues and the prediction is reported in the following cycle at 412A. If there is a prediction in the BTB 310 row but it is not in the MRU column, then the search initiated by the re-index in the Hit1 cycle is stopped and the BTB 310 is re-indexed in the Hit2 cycle based on the information from the BTB entry containing the prediction at 410. During the Hit2 cycle when there is no prediction at all and no older search is simultaneously in a Hit1 cycle, the BTB is re-indexed with the next sequential search address (either +1 or +2 of the search with the miss) at 512 and 514.

Figure 6:
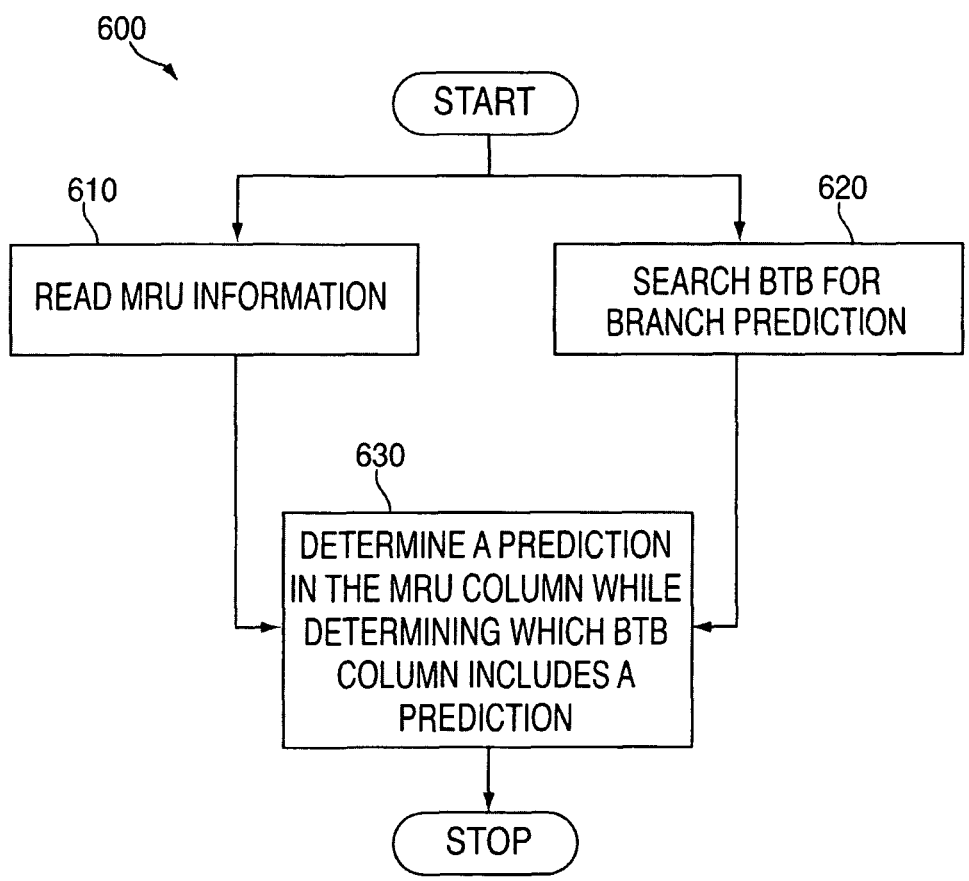
FIG. 6 illustrates a flow chart for a method for reducing branch prediction latency using a branch target buffer with most recently used column prediction.

FIG. 6 illustrates a flow chart for a method 600 for reducing branch prediction latency using a branch target buffer with most recently used column prediction. The method 600 illustrates one example of how the latency reduction can occur in the processor pipeline 300. It is appreciated that other methods are possible in other exemplary implementations and embodiments.

At block 610, the method 600 reads the MRU information from a MRU table associated with the pipeline 200. At block 620, the method searches the BTB 310 for a branch prediction. It is appreciated that the method 600 searches the BTB 310 for a branch prediction at block 620 simultaneously with reading the most-recently used information at block 610. At block 630, the method 600 assumes that there is a prediction in the MRU column while determining which column in the BTB 310 includes a prediction.

In an exemplary embodiment, it is appreciated that the method 600 therefore indexes the pipeline 300 in preparation for a prediction. Then, the method 600 accesses the microprocessor 105 for branch address data associated with the prediction. The method 600 then examines the branch address data to determine the presence of a prediction in a first microprocessor cycle (e.g., cycle 4 of FIG. 4). Then, in a second microprocessor cycle (e.g., the fifth cycle of FIG. 4) and in response to the presence of a branch prediction in the first microprocessor cycle, the method 600 determines a target for the branch prediction and re-indexing the pipeline with the target as a starting address for a next branch prediction. As such, instead of waiting to determine if there is a branch prediction and which branch prediction before re-indexing the pipeline 300, the method 600 access the MRU 320 information to speculate that there will be a branch prediction based on the predictions that have occurred most-recently at the address locations in the MRU 320. Therefore, the method 600 implements the speculated prediction for the next cycle, while simultaneously accessing the current branch prediction in the BTB 310. In this way, the method 600 is already determining a next branch prediction while processing a current branch prediction. Furthermore, if the speculated branch prediction is incorrect, the method 600 simply re-determines the branch prediction in the next cycle. In this way, the method 600 is not penalized if the branch prediction is not in the MRU 320.

As a result of the summarized invention, the systems and methods described herein implement a microprocessor having an n-way set associative BTB, and implement most-recently-used (MRU) information to decrease branch prediction latency. Branch prediction latency is improved when the prediction is actually in the MRU column and does not penalize cases when the desired branch prediction is not in the MRU column.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a microprocessor with branch prediction, the microprocessor including a microprocessor pipeline having an instruction stream and a branch target buffer, a method for reducing branch prediction latency, the method comprising:

reading most-recently-used information from a most-recently-used table associated with the branch target buffer where each most-recently-used entry in the most-recently-used table corresponds to one or more branch target buffer rows and specifies the ordering from least-recently-used to most-recently-used of branch target buffer columns in the one or more branch target buffer rows;

selecting a row from the branch target buffer based on a current search address and simultaneously selecting an associated entry from the most-recently-used table identifying a most-recently-used column of the branch target buffer columns from the selected row from the branch target buffer; and speculating that there is a prediction corresponding to the current search address in the most-recently-used column of the branch target buffer columns from the selected row from the branch target buffer while determining whether one of the branch target buffer columns of the selected row contains the prediction corresponding to the current search address and prior to determining whether the most-recently-used column of the branch target buffer columns from the selected row from the branch target buffer correctly identified the prediction.

2. The method as claimed in claim 1 wherein a time period in which predicted branch information can be reported is shortened.

3. The method as claimed in claim 1 further comprising accelerating how quickly the next prediction can be provided.

4. The method as claimed in claim 1 further comprising maintaining least-recently-used and most-recently-used data in rows associated with the branch target buffer.

5. The method as claimed in claim 4 further comprising replacing a least-recently-used entry in the branch target buffer in response to encountering a branch for the first time and updating the corresponding entry in the most-recentlyused table by marking the previously indicated least-recently-used column as now being a most-recently-used entry.

6. The method as claimed in claim 4 further comprising updating the most-recently-used table upon completing a predicted branch by marking a branch target buffer column for the predicted branch as being most-recently-used.

7. A system for reducing branch prediction latency, the system comprising:
   a microprocessor with branch prediction, the microprocessor including a microprocessor pipeline having an instruction stream and a branch target buffer, wherein the microprocessor is configured to perform a method comprising:
   reading most-recently-used information from a most-recently-used table associated with the branch target buffer where each most-recently-used entry in the most-recently-used table corresponds to one or more branch target buffer rows and specifies the ordering from least-recently-used to most-recently-used of branch target buffer columns in the one or more branch target buffer rows;
   selecting a row from the branch target buffer based on a current search address and simultaneously selecting an associated entry from the most-recently-used table identifying a most-recently-used column of the branch target buffer columns from the selected row from the branch target buffer; and
   speculating that there is a prediction corresponding to the current search address in the most-recently-used column of the branch target buffer columns from the selected row from the branch target buffer while determining whether one of the branch target buffer columns of the selected row contains the prediction corresponding to the current search address and prior to determining whether the most-recently-used column of the branch target buffer columns from the selected row from the branch target buffer correctly identified the prediction.

8. The system as claimed in claim 7 wherein the microprocessor further performs maintaining least-recently-used and most-recently-used data in rows associated with the branch target buffer.

9. The system as claimed in claim 8 wherein the microprocessor further performs updating the most-recently-used table upon completing a predicted branch by marking a branch target buffer column for the predicted branch as being most-recently-used.

10. A computer program product for reducing branch prediction latency, the computer program product comprising:
   a non-transitory tangible storage medium readable by a microprocessor comprising a branch target buffer and storing instructions for execution by the microprocessor for performing a method comprising:
   reading most-recently-used information from a most-recently-used table associated with the branch target buffer where each most-recently-used entry in the most-recently-used table corresponds to one or more branch target buffer rows and specifies the ordering from least-recently-used to most-recently-used of branch target buffer columns in the one or more branch target buffer rows;
   selecting a row from the branch target buffer based on a current search address and simultaneously selecting an associated entry from the most-recently-used table identifying a most-recently-used column of the branch target buffer columns from the selected row from the branch target buffer; and
   speculating that there is a prediction corresponding to the current search address in the most-recently-used column of the branch target buffer columns from the selected row from the branch target buffer while determining whether one of the branch target buffer columns of the selected row contains the prediction corresponding to the current search address and prior to determining whether the most-recently-used column of the branch target buffer columns from the selected row from the branch target buffer correctly identified the prediction.

11. The computer program product as claimed in claim 10 further comprising maintaining least-recently-used and most-recently-used data in rows associated with the branch target buffer.

12. The computer program product as claimed in claim 11 further comprising replacing a least-recently-used entry in the branch target buffer based on encountering a branch for the first time and updating the corresponding entry in the most-recently-used table by marking the previously indicated least-recently-used column as now being a most-recently-used entry.

13. The computer program product as claimed in claim 11 further comprising updating the most-recently-used table upon completing a predicted branch by marking a branch target buffer column for the predicted branch as being most-recently-used.

* * * * *